Oct. 27, 1964

M. E. HODGES 3,154,737

PHASE-SEQUENCE NETWORK FOR ELIMINATING RESPONSE FAILURE UPON
POSITIVE AND NEGATIVE SEQUENCE CANCELLATION

Filed May 13, 1960

Inventor:
Merwyn E. Hodges,
by Albert S. Richardson Jr.
Attorney.

Inventor:
Merwyn E. Hodges,
by Albert S. Richardson Jr.
Attorney.

United States Patent Office 3,154,737
Patented Oct. 27, 1964

3,154,737
PHASE-SEQUENCE NETWORK FOR ELIMINATING RESPONSE FAILURE UPON POSITIVE AND NEGATIVE SEQUENCE CANCELLATION
Merwyn E. Hodges, Philadelphia, Pa., assignor to General Electric Company, a corporation of New York
Filed May 13, 1960, Ser. No. 28,880
7 Claims. (Cl. 324—108)

This invention relates to electric networks, and more particularly it relates to a phase sequence network or filter for segregating the symmetrical components of current in a polyphase alternating-current electric power circuit.

The theory of symmetrical components is well understood by those skilled in the art of electric power transmission and distribution. In accordance with this theory, the phase currents in any unbalanced 3-phase alternating-current electric circuit can be resolved into three sets of symmetrical, balanced current vectors known respectively as positive-phase-sequence, negative-phase-sequence and zero-phase-sequence components. The negative- and zero-phase-sequence components of circuit current are not present under balanced circuit conditions.

It is sometimes desirable to separate out of the currents in a 3-phase circuit a single-phase, line-frequency electric quantity that is directly proportional to a particular phase sequence component, and for this purpose phase sequence filters or networks have been used. This is particularly true in the protective relaying art, for the magnitude of negative-phase-sequence currents in a circuit is indicative of the presence and severity of an abnormal or fault condition. Therefore, negative-phase-sequence networks are commonly employed, for example, in relaying schemes for providing unbalanced fault protection of generators. Another application for such networks is in phase-comparison relaying systems for transmission line protection.

In some instances, such as in the phase-comparison protective relaying system mentioned above, it is desirable that a negative-phase-sequence network also be capable of positive-phase-sequence response under balanced 3-phase fault conditions. Toward this end, balanced-fault responsive switching means have been used to change or distort the network parameters so that the single-phase quantity derived by the network will be a function of both negative- and positive-phase-sequence components of circuit current. This prior art technique is fully explained and claimed in Patent 2,456,976 issued to A. J. McConnel on December 21, 1948.

A problem has arisen in prior art networks of this type due to the fact that the ratio of the positive-phase-sequence components to the negative-phase-sequence components of circuit current cannot be predicted for some fault conditions. During double-ground faults on a 3-phase electric power circuit, that is, when concurrent short circuits occur between ground and two different phase conductors of the circuit, the ratio of positive- to negative-phase-sequence current will depend upon the fault location which is unpredictable. As a result, there has been a real possibility in prior art networks that the positive- and negative-phase-sequence-responsive components of the network output might cancel each other, whereby the network would incorrectly fail to produce a net output quantity.

Accordingly, it is an object of the present invention to provide an improved phase sequence network, capable of response to the combination of positive- and negative-phase-sequence components of current in a 3-phase electric power circuit, wherein the possibility of incorrect response due to cancellation can be eliminated.

A general object of my invention is the provision of a relatively simple, low cost, conveniently adjustable phase sequence network utilizing two separate transforming means comprising transactors.

A "transactor" is a device having electrical characteristics similar in some respects to a conventional transformer and similar in other respects to a reactor. In effect it is an air-gap reactor having associated therewith primary and secondary windings, with a loading resistor being connected across the secondary winding. The voltage derived across the secondary winding of this device is accurately representative of the net primary current energizing it both in magnitude and phase. Secondary voltage is related to primary current by a complex proportionality constant or vector operator known as the transfer impedance of the transactor. The transfer impedance, and hence the magnitude of the secondary voltage and the specific angle by which it leads the net primary current, can be controlled by varying the amount of load in the secondary circuit.

In carrying out my invention in one form, I provide first and second transforming means which are coupled to a multiconductor 3-phase alternating-current electric power circuit in a manner to derive, respectively, a first alternating voltage proportional to the vector difference between the phase currents in two different conductors of the circuit and a second alternating voltage proportional to the vector difference between the lagging one of said phase currents and the zero-phase-sequence component of phase current. The transforming means are connected in series with each other to a pair of output terminals so that the first and second voltages are applied in voltage-additive relation to these terminals. Consequently, a network is formed whose output voltage can be made solely dependent upon the magnitude of negative-phase-sequence current in the power circuit.

In one aspect of the invention, the first and second transforming means comprise, respectively, first and second transactors loaded by impedance means connected across the secondary windings thereof. The impedance means connected across the secondary winding of the second transactor comprises an adjustable resistor for varying the loading on the second transactor and includes an adjustable midtap for tapping a variable portion thereof. One of the output terminals of this network is connected to the midtap.

In another aspect of the invention, a shunting circuit of negligible impedance is connected in parallel with one part of the impedance means loading the second transactor, and switching means is provided to open and close this circuit. The adjustment for varying the loading on the second transactor and the aforesaid midtap are both included in the part of the impedance means paralleled by the shunting circuit. By selecting the remaining part of this impedance means so that with the switching means closed the alternating voltage derived by the second transactor is related to the net energizing quality thereof by a vectorial operator which is $\sqrt{3}$ times as great in magnitude and 30° lagging in angle with respect to the complex proportionality constant which relates the first alternating voltage to the vector difference between the phase currents energizing the first transactor, the output voltage of the network will be representative of the magnitude of the negative-phase-sequence components of circuit current only. The output voltage can be made representative of the magnitude of the negative-phase-sequence components in combination with the positive-phase-sequence components of current in the circuit by opening the aforesaid switching means.

My invention will be better understood and its various objects and advantages will be more fully appreciated from the following description taken in conjunction with the accompanying drawings in which.

Figure 1:
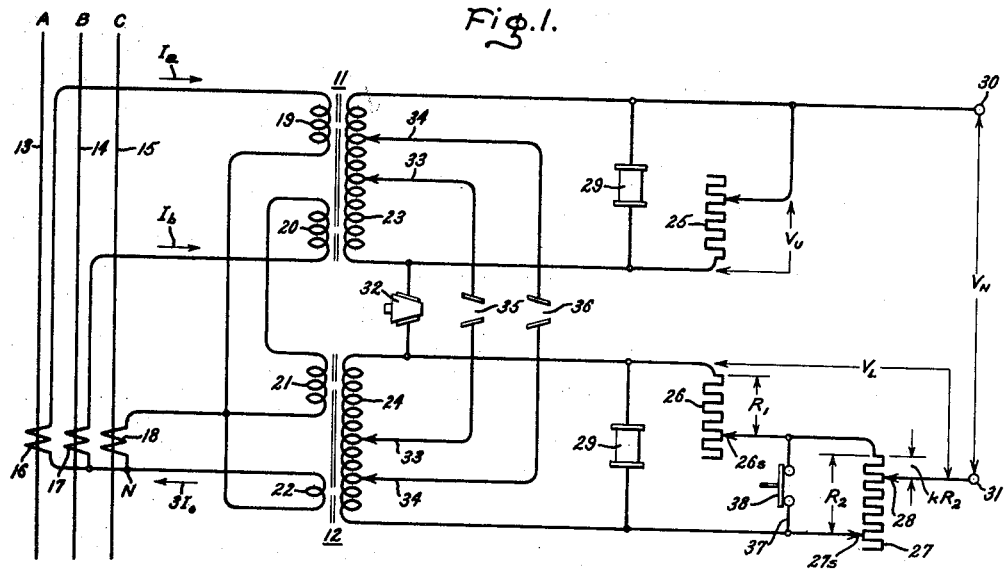
FIG. 1 is a schematic circuit diagram illustrating a preferred embodiment of my phase sequence network.
Figure 2:
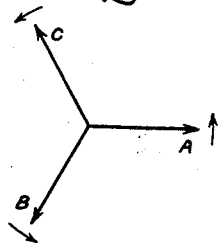
FIG. 2 is a phasor diagram showing the phase rotation of the 3-phase currents in the electric power circuit of FIG. 1.

Referring now to FIG. 1, I have shown a phase sequence network comprising two separate transforming means 11 and 12 respectively adapted to be coupled to a multiconductor 3-phase alternating-current electric power circuit. Only a section of the electric power circuit comprising the phase conductors 13, 14 and 15 has been shown in FIG. 1. The A.-C. currents flowing in the conductors 13, 14 and 15 have a conventional A–B–C phase rotation, as indicated in FIG. 2.

In order to couple the transforming means 11 and 12 to the electric power circuit, a set of three star-connected current transformers 16, 17 and 18 is provided. These current transformers are inductively associated with the phase conductors 13, 14 and 15, respectively, and the common connection of their secondary windings is identified in FIG. 1 by the reference letter N. Each of the current transformers 16, 17 and 18 provides a stepped-down current ($I_a$, $I_b$, and $I_c$, respectively) accurately representative of the phase current in the circuit conductor to which it is coupled.

The transforming means 11 and 12 preferably comprise a pair of transactors each having two primary windings, an air-gap iron core and a single secondary winding. As can be seen in FIG. 1, the primary windings 19 and 20 of transactor 11 are connected with reverse polarities to the current transformers 16 and 17, respectively. Thus, current $I_a$ flows from current transformer 16 downwardly through the primary winding 19, while current $I_b$ of current transformer 17 flows upwardly in the primary winding 20. Current $I_b$ is lagging with respect to $I_a$. The primary windings 19 and 20 have substantially equal turns, and hence the net energizing quantity of transactor 11 is in effect the vector difference between $I_a$ and $I_b$.

As can be clearly seen in FIG. 1, the primary winding 21 of the lower transactor 12 is connected in series with primary winding 20 of transactor 11 to the current transformer 17 for energization by the current $I_b$. The primary winding 22 of the transactor 12 has only one-third the number of turns as winding 21 and it is connected to the neutral N of the star-connected current transformers. Hence, winding 22 carries the residual current $3I_0$ of the current transformers. It will be understood by those skilled in the art that $I_0$ is the zero-phase-sequence component of each phase current and that the neutral or residual current flowing in the current transformers comprises three such components in additive relation. The primary windings 21 and 22 of transactor 12 are arranged in polarity disagreement, and since the residual current $3I_0$ traverses only one-third as many turns as the phase current $I_b$, the net energizing quantity of this transactor is in effect $I_b$ less $I_0$.

Adjustable impedance means are connected across the secondary windings 23 and 24 of the transactors 11 and 12, respectively, to control the loading of these transactors. The impedance means across the secondary winding 23 of the upper transactor 11 comprises an adjustable resistor 25, as can be seen in FIG. 1. Part of the impedance means across the secondary windings 24 of the lower transactor 12 is another adjustable resistor 26, and a potentiometer 27 is connected in series therewith. The adjustable resistor 26 is provided with a slider 26s to permit the selection of an adjustable amount of resistance ($R_1$ ohms), and the potentiometer 27 also is provided with a slider 27s to permit the selection of an adjustable amount of resistance ($R_2$ ohms) for varying the loading ($R_1+R_2$) on the transactor 12. An adjustable tap 28 is disposed between the end terminals of potentiometer 27, and this midtap enables a variable portion $k$ of the total potentiometer resistance $R_2$ to be tapped.

In addition to the loading resistors 25, 26 and 27 described above, each of the transactor secondary windings has connected thereacross a voltage limiter 29. The voltage limiter 29 has a non-linear current-voltage characteristic, that is, the ohmic value of the limiter decreases with increasing voltage applied across it so that current will increase at a greater rate than voltage. As the transactor secondary voltage increases above its normal range of magnitudes, the limiter 29 provides increasingly greater secondary load to limit the maximum possible peak value of secondary voltage to a safe level.

As can be seen in FIG. 1, suitable electric connections are provided to connect the secondary windings 23 and 24 of both transactors 11 and 12 in series circuit relationship to a pair of output terminals 30 and 31. In this manner the secondary voltages of the transactors are applied in voltage-additive relation to the output terminals 30 and 31 of the network. The connection from terminal 31 is made to the midtap 28 of the potentiometer 27 so that only a tapped portion of the secondary voltage of the transactor 12 is actually used.

In order to provide means for changing the sensitivity of the phase sequence network, the serial connection between the secondary windings 23 and 24 is made through a removable electroconductive plug 32, and alternative taps 33 and 34 are provided on each secondary winding. By moving the plug 32 from the position in which it is shown in FIG. 1 to a second position 35, only one-half of the induced voltage across each secondary winding is included between the output terminals 30 and 31, and insertion of the plug at 36 results in another 2:1 reduction.

The potentiometer 27 of the impedance means connected across the secondary winding 24 of the transactor 12 has a shunting circuit 37 of negligible impedance connected in parallel therewith. Switching means, such as the illustrated contact 38, is included to open and close the shunting circuit 37. With the switching means 38 closed, the resistance $R_2$ of the potentiometer 27 is omitted from the total loading resistance connected across winding 24. Operation of the switching means from its closed position shown in FIG. 1 to an open position inserts the potentiometer 27 into the loading circuit.

Operation of the switching means 38 is intended to be controlled by balanced-fault responsive means, not shown. This is in accordance with the teachings of the McConnell Patent 2,456,976 referred to hereinbefore. In the absence of a balanced or 3-phase fault on the electric power circuit, the switching means 38 usually remains closed. However, the means controlling the switch 38 will actuate this switch in response to double-ground faults occurring at certain critical locations along the protected circuit.

The output voltage of the phase sequence network shown in FIG. 1 is:

$$\overline{V}_N = \overline{V}_U + \overline{V}_L \tag{1}$$

In other words, the resultant or net voltage $\overline{V}_N$ across the output terminals 30 and 31 of the network is the vector sum of the secondary voltage $\overline{V}_U$ derived by the upper transactor 11 and the secondary voltage $\overline{V}_L$ derived by the lower transactor 12. The transactor secondary voltages are as follows:

$$\bar{V}_U = (\bar{I}_a - \bar{I}_b)\bar{Z}_U \qquad (2)$$

and $$\bar{V}_L = (\bar{I}_b - \bar{I}_0)\bar{Z}_L \qquad (3)$$

where $\bar{Z}_U$ and $\bar{Z}_L$ are the complex proportionality constants or transfer impedances which relates the secondary voltages of the respective transactors to the net energizing quantities thereof.

The loading resistor 25 of the upper transactor 11 is preferably adjusted so that the vectorial proportion $\bar{Z}_U$ has a constant magnitude $Z_U$ at a characteristic angle of approximately 75 angular degrees with respect to the net current flowing in the primary windings.

In the case of the lower transactor 12, the magnitude and angle of the vectorial proportion $\bar{Z}_L$ depends upon the adjustments of sliders 26s and 27s and of midtap 28 and upon the open or closed circuit disposition of the switching means 38 which shunts the potentiometer 27.

Further consideration of the illustrated phase sequence network will be divided in accordance with the two alternative conditions under which it operates, namely, with switching means 38 closed and with switching means 38 open. It will be shown that while in the former condition the network derives an output voltage representative solely of the magnitude of the negative-phase-sequence components of circuit current, while in the latter condition its output voltage is representative of the magnitude of negative-phase-sequence current in combination with positive-phase-sequence current.

SWITCHING MEANS 38 CLOSED

By appropriately setting the slider 26s of the lower transactor-loading resistor 26 (switching means 38 being closed), the vectorial proportion $\bar{Z}_L$ is made $\sqrt{3}$ times as great in magnitude and 30 degrees lagging in angle with respect to $\bar{Z}_U$. Hence, with switching means 38 closed and assuming that load current between output terminals 30 and 31 is so small as to produce negligible voltage drop in $kR_2$.

$$\bar{Z}_L = \sqrt{3}\bar{Z}_U \underline{/-30°} \qquad (4)$$

The output voltage $V_N$ can be determined by a symmetrical component analysis of the currents and voltages of the network. In this analysis the subscripts 1, 2 and 0 will be used in the conventional manner to designate, respectively, positive-phase-sequence, negative-phase-sequence, and zero-phase-sequence components. The positive-phase-sequence component of current in phase A ($I_{a1}$) is used as a reference vector, unless otherwise noted.

Zero-Phase-Sequence-Components

The zero-phase-sequence components of circuit current may be disposed of first. Since $\bar{I}_{a0} = \bar{I}_{b0} = \bar{I}_0$, these components will cancel out in the reversely poled companion primary windings of both the upper and lower transactors 11 and 12, and consequently the network is entirely unresponsive to the zero-phase-sequence components of circuit current.

Positive-Phase-Sequence-Components

The positive-phase-sequence components of circuit current have the phase relationships shown in FIG. 2. Under balanced circuit conditions, all other components of circuit current are zero. Knowing that $\bar{I}_{b1} = \bar{I}_{a1} \underline{/-120°}$ and substituting in Equation 2, the positive-phase-sequence component of the secondary voltage of the upper transactor 11 will be:

$$\bar{V}_{U1} = (\bar{I}_{a1} - \bar{I}_{a1} \underline{/-120°})\bar{Z}_U \qquad (5)$$

which, when the angle of $\bar{Z}_U$ is taken as 75 degrees, simplifies to:

$$\bar{V}_{U1} = \sqrt{3}\bar{I}_{a1}Z_U \underline{/105°} \qquad (6)$$

Figure 3:
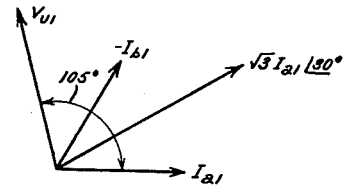
FIGS. 3–7 are vector diagrams illustrating the relationships among various currents and voltages of the network illustrated in FIG. 1.

This voltage vector is derived graphically in FIG. 3.

Figure 4:
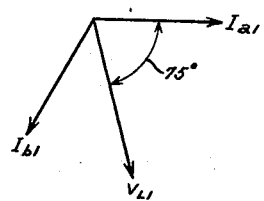

Similarly, by substituting in Equation 3, the positive-phase-sequence component of the secondary voltage of the lower transactor 12 is as follows:

$$\bar{V}_{L1} = \bar{I}_{a1} \underline{/-120°} \bar{Z}_L \qquad (7)$$

and by using Equation 4 this can be simplified to:

$$\bar{V}_{L1} = \sqrt{3}\bar{I}_{a1}Z_U \underline{/-75°} \qquad (8)$$

which is derived graphically in FIG. 4.

From FIGS. 3 and 4 it will be observed that $V_{U1}$ and $V_{L1}$ are equal in magnitude and opposite in direction, and consequently there will be no net positive-phase-sequence component of voltage across the output terminals 30 and 31 of the network as long as switching means 38 is closed. The total voltage across output terminals 30 and 31 is zero, with switching means 38 closed, during all balanced circuit conditions, since there are no negative-phase-sequence components present under such conditions.

Negative-Phase-Sequence-Components

The negative-phase-sequence components of the 3-phase circuit currents, which components are present only during unbalanced circuit conditions, have an A–C–B phase rotation—just the reverse of the positive-phase-sequence components of current (FIG. 2). Knowing that $\bar{I}_{b2} = \bar{I}_{a2} \underline{/120°}$, and using this equality in Equations 2 and 3 and simplifying, the negative-phase-sequence components of the secondary voltages of the upper and lower transactors 11 and 12, respectively, are determined to be:

$$\bar{V}_{U2} = \sqrt{3}\bar{I}_{a2}Z_U \underline{/45°} \qquad (9)$$

and $$\bar{V}_{L2} = \sqrt{3}\bar{I}_aZ_U \underline{/165°} \qquad (10)$$

Figure 5:
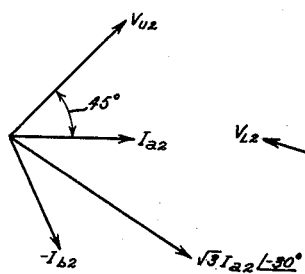
Figure 6:
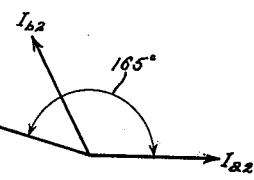

For the graphical derivations of these voltages, see FIGS. 5 and 6 where the negative-phase-sequence component $\bar{I}_{a2}$ of current in phase A is used as the reference vector.

Figure 7:
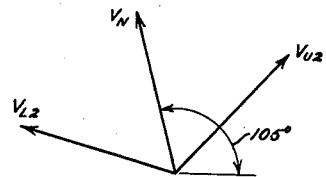

It will be observed that $V_{U2}$ and $V_{L2}$ are equal in magnitude, and their vector sum is the resultant voltage $$\bar{V}_N = \sqrt{3}\bar{I}_{a2}Z_U \underline{/105°} \qquad (11)$$

taken across the output terminals 30 and 31 of the network with the switching means 38 closed. This is shown in FIG. 7. Thus, the output voltage of the network for the condition under consideration is dependent solely upon the magnitude of negative-phase-sequence current in the 3-phase A.-C. electric power circuit.

Switching Means 38 Open

Whenever the shunting circuit 37 which is connected in parallel with the potentiometer 27 of the network shown in FIG. 1 is open circuited by opening the switching means 38, the resistance $R_2$ of the potentiometer is inserted in series with the resistance $R_1$ of the resistor 26, thereby changing the load on the lower transactor 12. The purpose of this parameter change, as has been pointed out hereinbefore, is to render the network operative to produce an output voltage dependent upon the magnitude of positive-phase-sequence current as well as upon negative-phase-sequence current in the electric power circuit 13–15.

With switching means 38 open, the value of the transfer impedance of the lower transactor 12 is no longer as indicated in Equation 4 above, but is now:

$$\bar{Z}_L = Z_L \underline{/\theta} \qquad (12)$$

where $$\theta = \tan^{-1}\left(\frac{R_1 + R_2}{R_1}\right) \qquad (13)$$

and $$Z_L = \left(\frac{R_1 + kR_2}{R_1 + R_2}\right)\sqrt{6}\, Z_U \sin\theta \qquad (14)$$

As before, the network is unresponsive to the zero-phase-sequence components of circuit current. The positive- and negative-phase-sequence components of the secondary voltage derived by the upper transactor 11 are still defined by the hereinbefore set forth Equations 6 and 9, respectively.

From Equation 3 the positive- and negative-phase-sequence components of the secondary voltage derived by the lower transactor 12 during unbalanced circuit conditions can be shown to be as follows:

$$\overline{V}_{L1} = \overline{I}_{a1} Z_L \underline{/\theta - 120°} \qquad (15)$$

and $$\overline{V}_{L2} = \overline{I}_{a2} Z_L \underline{/+120°} \qquad (16)$$

The net positive-phase-sequence component $V_{N1}$ of the network output voltage is the vector sum of $\overline{V}_{U1}$ and $\overline{V}_{L1}$, and the net negative-phase-sequence component $V_{N2}$ of the output voltage is the vector sum of $\overline{V}_{U2}$ and $\overline{V}_{L2}$.

Those skilled in the art will recognize that the angular displacement between $V_{N2}$ and $V_{N1}$ will be different for different kinds of circuit faults. This is because the relative phase positions of the negative- and the positive-sequence components of each phase current in the electric power circuit depend upon the nature of a circuit unbalance. For example, during the AG fault (a short circuit between phase A and ground), the negative-phase-sequence component $I_{a2}$ of phase A current is in phase agreement with the positive-phase-sequence component $I_{a1}$, and since $\overline{I}_{a1}$ is being used as the reference vector, $\overline{I}_{a2}$ (AG) may be written $I_{a2}\underline{/0°}$. The vector $\overline{I}_{a2}$ advances angularly with respect to $\overline{I}_{a1}$ in a progression of 60° steps corresponding respectively to the following unbalanced faults: AB (a short circuit between phase A and phase B); BG; BC; CG; CA.

In order to prevent cancellation of the positive- and negative-phase-sequence components of the network output voltage regardless of the kind of fault or its location, it is important that $V_{N1}$ and $V_{N2}$ have different magnitudes whenever they are 180° out-of-phase with respect to each other. This desired objective can be realized with the network of my invention by appropriately adjusting slider 27s and midtap 28 of the potentiometer 27. These adjustments should be made to satisfy the criteria of Equations 18 and 19 set forth below.

Let $$\frac{\overline{V}_{N1}}{\overline{V}_{N2}(AG)} = \gamma \underline{/-60°} \qquad (17)$$

for an AG phase-to-ground fault, where $\gamma$ is the desired magnitude ratio of the positive- to the negative-phase-sequence components of network output voltage with $V_{N1}$ lagging $V_{N2}$ by 60°. The quantity $\gamma$ will be referred to hereinafter as the response ratio of the network with switching means 38 open. For other phase-to-ground faults (BG and CG), the response ratio remains constant although the angle of phase displacement between $V_{N1}$ and $V_{N2}$ changes (see FIG. 10).

By combining Equations 6 and 15 and Equations 9 and 16, using the equalities of Equations 13 and 14, and substituting in Equation 17, it can be shown that:

$$\frac{R_2}{R_1} = \frac{\sqrt{3}\,\gamma}{1 - \left(\frac{\sqrt{3}-1}{2}\right)\gamma} \qquad (18)$$

and $$k = \frac{(\sqrt{3}+1)\gamma + \sqrt{3} - 1}{2\sqrt{3}(\gamma + 1)} \qquad (19)$$

Thus, for any desired response ratio, $\gamma$, $R_2/R_1$ and $k$ can be readily determined.

By substituting equations 18 and 19 in Equations 13 and 14, the transfer impedance $\overline{Z}_L$ of the lower transactor 12 can be written in terms of the response ratio $\gamma$ as follows:

$$\theta = \tan^{-1} \frac{1 + \frac{1}{2}\gamma(\sqrt{3}+1)}{1 - \frac{1}{2}\gamma(\sqrt{3}-1)} \qquad (20)$$

$$Z_L = \frac{\sqrt{3}(1+\gamma+\gamma^2)^{1/2}}{1+\gamma} Z_U \qquad (21)$$

Now from Equations 6, 15 and 21 it is possible to write an equation for the net positive-phase-sequence component of the voltage across the output terminals of the network in terms of the constants $Z_U$, $\theta$ and $\gamma$, letting $(1+\gamma+\gamma^2)^{1/2} = M$ and $1+\gamma = N$ for the sake of simplification:

$$\overline{V}_{N1} = \sqrt{3}\overline{I}_{a1} Z_U \left[ \underline{/105°} + \frac{M}{N}\underline{/\theta - 120°} \right] \qquad (22)$$

Figure 8:
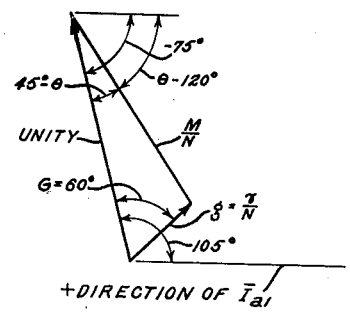
FIGS. 8 and 9 are trigonometric representations of certain constants of the illustrated network.

The bracketed vector sum in Equation 22 is equal to $$\frac{\gamma}{N}\underline{/45°}$$

as shown graphically in FIG. 8. Since the lengths of two sides of the FIG. 8 triangle and the angle therebetween are all known constant quantities, the unknown side $g$ and the angle G can be found by trigonometry. It will be observed that G, which is the angle by which the positive-phase-sequence component of the network output voltage lags the positive-phase-sequence component of the secondary voltage of the upper transactor 11, is a constant 60° regardless of the magnitude chosen for the response ratio $\gamma$. Substituting the magnitude of $g$ and its angle with respect to the reference vector into Equation 22 gives:

$$\overline{V}_{N1} = \sqrt{3}\overline{I}_{a1} Z_U \frac{\gamma}{N}\underline{/45°} \qquad (23)$$

From Equations 9, 16 and 21, an equation for the net negative-phase-sequence component of the network output voltage may be now written in terms of the constants $Z_U$, $\theta$ and $\gamma$:

$$\overline{V}_{N2} = \sqrt{3}\overline{I}_{a2} Z_U \left[ \underline{/45°} + \frac{M}{N}\underline{/\theta + 120°} \right] \qquad (24)$$

Figure 9:
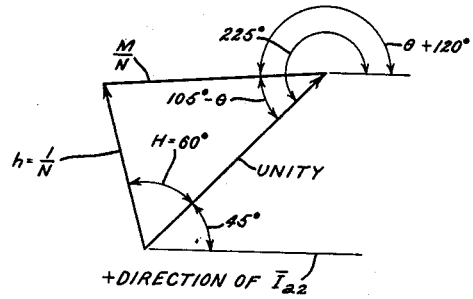

The bracketed vector sum in Equation 24 is equal to $$\frac{1}{N}\underline{/150°}$$

as is shown graphically in FIG. 9. Since the lengths of two sides of the FIG. 9 triangle and the angle therebetween are all known constant quantities, the unknown side $h$ and angle H can be found by trigonometry. It will be observed that H, which is the angle by which the negative-phase-sequence component of the output voltage leads the negative-phase-sequence component of the secondary voltage of the upper transactor 11, is a constant 60° regardless of the magnitude chosen for the response ratio $\gamma$. Substituting the magnitude of $h$ and its angle with respect to the reference vector $\overline{I}_{a2}$ in Equation 24 gives:

$$\overline{V}_{N2} = \sqrt{3}\overline{I}_{a2} Z_U \frac{1}{N}\underline{/105°} \qquad (25)$$

The vector sum of $V_{N1}$ and $V_{N2}$, taken from Equations 23 and 25, is the resultant voltage $$\overline{V}_N = \frac{\sqrt{3} Z_U}{1+\gamma} (\gamma \overline{I}_{a1}\underline{/45°} + \overline{I}_{a2}\underline{/105°}) \qquad (26)$$

appearing across the output terminals 30 and 31 of the network with the switching means 38 open. Thus, it is seen that the output voltage of my network for the condition under consideration is dependent upon the magnitude of the negative-phase-sequence current in combination with positive-phase-sequence current of the electric power circuit.

Figure 10:
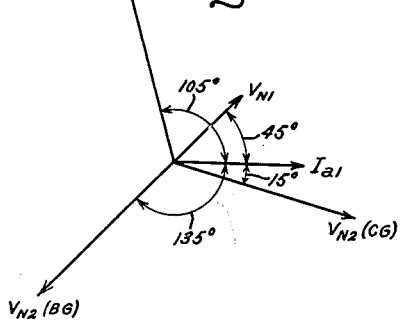
FIGS. 10 and 11 are vector diagrams of the positive- and negative-phase-sequence components of the network output voltages under various fault conditions.
Figure 11:
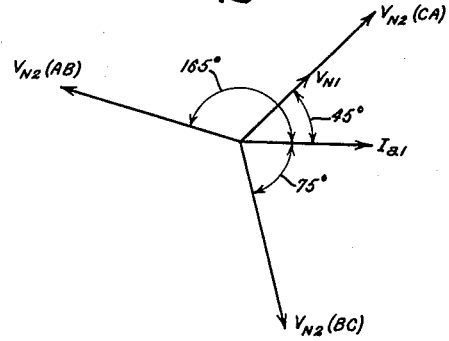

In FIGS. 10 and 11 I have illustrated the angular relationships between $V_{N1}$ and $V_{N2}$ for various kinds of unbalanced faults on the electric power circuit. In all cases $\bar{I}_{a1}$ is the reference vector, and therefore $V_{N1}$ maintains a constant characteristic angle of 45° (Equation 23). As has been previously pointed out, the relative phase position of the vector $\bar{I}_{a2}$ varies in accordance with the kind of fault, and this is the reason for the different characteristic angles of the negative-phase-sequence voltage component $\bar{V}_{N2}$ (Equation 25) in FIGS. 10 and 11. Under double-ground fault conditions, the relative phase relationships of the positive- and negative-phase-sequence currents and voltages will correspond generally to those occurring during phase-to-phase faults as illustrated in FIG. 11.

It will be observed that the positive- and negative-phase-sequence components of the network output voltage are 180° out-of-phase with respect to each other only during a BG fault condition. By choosing a response ratio $\gamma$ that is not equal to one, cancellation of these components is avoided under this particular condition. During unbalanced fault conditions involving more than one phase (FIG. 11), $V_{N1}$ and $V_{N2}$ are never 180° out-of-phase, and therefore cancellation is impossible even though the relative magnitudes of these components are unpredictable under such conditions.

While I have shown and described a preferred form of my invention by way of illustration, many modifications will occur to those skilled in the art. I therefore contemplate by the claims which conclude the specification to cover all such modifications as fall within the true scope of my invention.

What I claim as new and desire to secure by Letters Patent of the United States is:

1. In a phase sequence network designed to provide an output voltage dependent upon the magnitude of negative-phase-sequence current in a multiconductor 3-phase alternating-current electric power circuit: two separate transforming means adapted to be coupled to the circuit for deriving, respectively, a first alternating voltage proportional to the vector difference between the phase currents in two different conductors of the circuit and a second alternating voltage proportional to the vector difference between the lagging one of said phase currents and the zero-phase-sequence component of phase current, a pair of output terminals, and means interconnecting both transforming means and the output terminals for applying said first and second voltages to the output terminals in voltage-additive relation, whereby the output voltage of the network is the vector sum of said first and second voltages.

2. In a phase sequence network designed to provide an output voltage dependent upon the magnitude of negative-phase-sequence current in a multiconductor 3-phase alternating-current electric power circuit; a set of three star-connected current transformers respectively coupled to the phase conductors of the circuit; a first reactor having a pair of primary windings and a loaded secondary winding associated therewith, said primary windings having substantially equal turns and being respectively connected with reverse polarities to two of said three current transformers so that the first reactor is energized in accordance with the vector difference between the phase currents flowing in the two different conductors to which said two current transformers are coupled; a second reactor having a pair of primary windings and a loaded secondary winding associated therewith, one of the primary windings of the second reactor being connected, in series with a primary winding of said first reactor, to the current transformer coupled to the phase conductor in which the lagging one of said phase currents flows, the other primary winding of the second reactor having one-third the number of turns of said one winding and being connected to the neutral of said star-connected transformers for carrying the residual current of the three current transformers, whereby said second reactor is energized in accordance with the vector difference between said lagging one of said phase currents and the zero-phase-sequence component of phase current; a pair of output terminals; and means connecting the secondary windings of said first and second reactors in series circuit relationship to said output terminals.

3. In a negative phase sequence network designed to provide an output voltage representative of the magnitude of negative-phase-sequence current in a multiconductor 3-phase alternating-current electric power circuit: a first reactor having associated therewith a secondary winding and a pair of primary windings adapted to be coupled to the circuit in a manner so that the first reactor is energized in accordance with the vector difference between the phase currents in two different conductors of the circuit; first impedance means connected across the secondary winding of said first reactor, said first impedance means being selected so that the first reactor derives a secondary voltage vectorially related by a predetermined complex proportionality constant to the vector difference between said phase currents; a second reactor having associated therewith a secondary winding and a pair of primary windings adapted to be coupled to the circuit in a manner so that the second reactor is energized, in accordance with the vector difference between the lagging one of said phase currents and the zero-phase-sequence component of phase current; second impedance means connected across the secondary winding of said second reactor, said second impedance means being selected so that the second reactor derives a secondary voltage related to the net energizing quantity thereof by a vectorial proportion which is the $\sqrt{3}$ times as great in magnitude and 30 degrees lagging in angle with respect to said predetermined complex proportionality constant; a pair of output terminals; and means serially connecting the secondary windings of said reactors to said output terminals for applying the reactor secondary voltage to the output terminals in voltage-additive relation.

4. In a phase sequence network designed to provide an output voltage dependent upon the magnitude of at least one of the symmetrical phase-sequence components of current in a multiconductor 3-phase alternating-current electric power circuit: a first reactor having associated therewith a secondary winding and a pair of primary windings adapted to be coupled to the circuit in a manner so that the first reactor is energized in accordance with the vector difference between the phase currents in two different conductors of the circuit; first impedance means connected across the secondary winding of said first reactor; a second reactor having associated therewith a secondary winding and a pair of primary windings adapted to be coupled to the circuit in a manner so that the second reactor is energized in accordance with the vector difference between the lagging one of said phase currents and the zero-phase-sequence component of phase current; second impedance means connected across the secondary winding of said second reactor, said second impedance means comprising an adjustable resistor for varying the loading on the second reactor and including an adjustable midtap for tapping a variable portion of the second impedance means; a pair of output terminals; and means serially connecting the first impedance means and the tapped portion of said second impedance means to said output terminals.

5. In a phase sequence network designed to provide an output voltage which is dependent upon the magnitude of negative-phase-sequence current in a multiconductor 3-phase alternating-current electric power circuit: a first air-gap reactor having associated therewith a secondary winding and a pair of primary windings adapted to be coupled to the circuit in a manner so that the first reactor is energized in accordance with the vector difference between the phase currents in two different conductors of the circuit; a first resistor connected across the secondary winding of said first reactor; a second air-gap reactor having associated therewith a secondary winding and a pair of primary windings adapted to be coupled to the circuit in a manner so that the second reactor is energized in accordance with the vector difference between the lagging one of said phase currents and the zero-phase-sequence component of phase current; a second resistor and a potentiometer connected in series circuit relationship across the secondary winding of said second reactor, said potentiometer having an adjustable tap between its end terminals; switching means connected across said potentiometer for providing a path of negligible resistance in parallel therewith; a pair of output terminals; and means serially connecting the first and second resistors and a tapped portion of said potentiometer to said output terminals.

6. In a phase sequence network designed to provide an output voltage representative of the magnitude of the negative-phase-sequence current in a multiconductor 3-phase alternating-current electric power circuit and alternatively representative of the magnitude of said negative-phase-sequence current in combination with the positive-phase-sequence current in the circuit; a first reactor having associated therewith a secondary winding and a pair of primary windings adapted to be coupled to the circuit in a manner so that the first reactor is energized in accordance with the vector difference between the phase currents in two different conductors of the circuit; first impedance means connected across the secondary winding of said first reactor, said first impedance means being selected so that the first reactor derives a secondary voltage vectorially related by a predetermined complex proportionality constant to the net energizing quantity thereof; a second reactor having associated therewith a secondary winding and a pair of primary windings adapted to be coupled to the circuit in a manner so that the second reactor is energized in accordance with the vector difference between the lagging one of said phase currents and the zero-phase-sequence component of phase current; second impedance means connected across the secondary winding of the second reactor; a shunting circuit of negligible impedance connected in parallel with one part of said second impedance means and including switching means operable to open the shunting circuit; an adjustable midtap associated with said one part of the second impedance means for tapping a variable portion thereof; the remaining part of said second impedance means being selected so that with said one part shunted by said shunting circuit the second reactor derives a secondary voltage related to the net energizing quantity thereof by a vectorial proportion which is the $\sqrt{3}$ times as great in magnitude and 30 degrees lagging in angle with respect to said predetermined complex proportionality constant; a pair of output terminals; and means serially connecting the first impedance means, said remaining part of second impedance means and the tapped portion of said one part of the second impedance means to said output terminals.

7. In a phase sequence network designed to provide an output signal dependent upon the magnitude of negative-phase-sequence current in a multiconductor 3-phase alternating-current electric power circuit, the combination of: first transforming means having primary and secondary windings, the primary windings being adapted to be coupled to two different conductors of the circuit for energization solely in accordance with the vector difference between the phase currents in said two conductors; second transforming means having primary and secondary windings, the primary windings of the second transforming means being adapted to be coupled to the circuit conductors for energization solely in accordance with the vector difference between the lagging one of said phase currents and one-third the residual of all three phase currents; and a pair of output terminals, the secondary windings of said first and second transforming means being serially connected between the output terminals to provide at said terminals an output signal which corresponds to the vector sum of the secondary quantities of the respective transforming means.

References Cited in the file of this patent

UNITED STATES PATENTS

| | | |
|---|---|---|
| 1,615,691 | Fortescue | Jan. 25, 1927 |
| 1,877,139 | Lewis | Sept. 13, 1932 |
| 2,161,829 | Lenehan | June 13, 1939 |
| 2,296,784 | Harder | Sept. 22, 1942 |
| 2,836,771 | Jessee | May 27, 1958 |
| 2,897,407 | Morris | July 28, 1959 |
| 3,024,389 | Warrington | Mar. 6, 1962 |

OTHER REFERENCES

Westinghouse Descriptive Bulletin 41–160, Negative Sequence Current Relays, Device Number: 46—March 1959.